(12) United States Patent
Mizuno

(10) Patent No.: US 8,102,738 B2
(45) Date of Patent: Jan. 24, 2012

(54) OPTICAL PICKUP AND OPTICAL DISK APPARATUS

(75) Inventor: Takao Mizuno, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 12/780,454

(22) Filed: May 14, 2010

(65) Prior Publication Data

US 2010/0290324 A1 Nov. 18, 2010

(30) Foreign Application Priority Data

May 15, 2009 (JP) .................................. 2009-119058

(51) Int. Cl.
*G11B 7/00* (2006.01)
(52) U.S. Cl. .................................................. 369/44.27
(58) Field of Classification Search ................ 369/44.27, 369/44.28, 44.29, 44.35
See application file for complete search history.

(56) References Cited

U.S. PATENT DOCUMENTS

| | | | | |
|---|---|---|---|---|
| 4,796,246 A | * | 1/1989 | Tsuyoshi et al. | 369/44.29 |
| 5,146,442 A | * | 9/1992 | Shikichi | 369/44.27 |
| 5,307,333 A | * | 4/1994 | Ikeda et al. | 369/44.28 |
| 5,835,459 A | * | 11/1998 | Takahara et al. | 369/44.28 |
| 5,896,354 A | * | 4/1999 | Yamashita et al. | 369/44.29 |
| 6,400,662 B1 | * | 6/2002 | Choi et al. | 369/44.28 |
| 6,574,175 B1 | * | 6/2003 | Yoon | 369/44.28 |
| 7,382,698 B2 | * | 6/2008 | Koyama | 369/44.32 |

FOREIGN PATENT DOCUMENTS

| | | |
|---|---|---|
| JP | 08-249684 | 9/1996 |
| JP | 08-329479 | 12/1996 |
| JP | 2000-173066 | 6/2000 |

* cited by examiner

*Primary Examiner* — Thang Tran
(74) *Attorney, Agent, or Firm* — Morgan, Lewis & Bockius LLP

(57) ABSTRACT

A microprocessor performs preliminary tracking servo control of an objecting lens by moving the objective lens in a radial direction of an optical disc so as to allow a laser beam reflected by the optical disc to be equally divided and received by first and second light receiving sections PD1, PD2 of the photodiode PD before the microprocessor starts tracking servo control of the objective lens. This makes it possible to perform preliminary tracking servo control of the objective lens before tracking pull-in, and thereby to obtain an appropriate tracking error signal for performing stable tracking pull-in, even when an optical disc with an offset center of gravity is mounted on an optical disc apparatus.

8 Claims, 3 Drawing Sheets

OPTICAL PICKUP AND OPTICAL DISK APPARATUS

BACKGROUND OF THE INVENTION

1. Field of the Invention

The present invention relates to an optical pickup used for an optical disc apparatus and to the optical disc apparatus.

2. Description of the Related Art

In an optical disc apparatus using an optical pickup, various technologies have been proposed for tracking control of an objective lens in the optical pickup. For example, Japanese Laid-open Patent Publication Hei 8-249684 discloses a technology to extract a tracking error signal at a predetermined position of an optical pickup, when moving the optical pickup at a high speed, so as to use the tracking error signal to prevent a change in position of a tracking actuator, a light beam and a photodetector. Japanese Laid-open Patent Publication 2000-173066 discloses a technology to short-circuit both ends of a tracking coil during rough seek and until entering into initial tracking pull-in operation so as to generate an induced electromotive force to be used for controlling the vibration of an objective lens. Further, Japanese Laid-open Patent Publication Hei 8-329479 discloses a technology to provide a switch for connecting a signal from a differential amplifier circuit to optical pickup moving means for servo to fix an objective lens system at a certain position relative to the moving system by closing the switch when the optical pickup moves in a direction perpendicular to the tracks for retrieval.

However, these technologies have problems as described below. More specifically, in some cases, an optical disc with an offset or eccentric center of gravity may be mounted on an optical disc apparatus. When such an optical disc with an offset center of gravity is rotated on a turntable at a high speed, the optical disc itself vibrates strongly. The vibrations of the optical disc are transmitted to the optical pickup via the turntable, a spindle motor and a shaft for supporting the optical pickup. When the optical pickup is vibrated excessively, the objective lens for irradiating a light beam to the optical disc is also vibrated strongly and displaced in e.g. a tracking direction, giving a bad influence to the light received by a photodiode (photodetector). As a result, it becomes impossible to obtain an appropriate tracking error signal, which may cause unstable tracking servo control and failure in tracking pull-in. More specifically, if an appropriate tracking error signal cannot be obtained, even the technology of Japanese Laid-open Patent Publication Hei 8-249684 described above may cause unstable tracking pull-in. Further, the technologies of Japanese Laid-open Patent Publications 2000-173066 and Hei 8-329479 described above cannot stabilize the tracking pull-in.

SUMMARY OF THE INVENTION

An object of the present invention is to provide an optical pickup and an optical disc apparatus that can obtain an appropriate tracking error signal and achieve stable tracking pull-in even when an optical disc with an offset center of gravity is mounted on the disc apparatus.

According to a first aspect of the present invention, this object is achieved by an optical pickup comprising: a light emitting element for emitting a laser beam; an objective lens for collecting the laser beam on a recording surface of the optical disc; a photodetector for receiving a beam reflected by the recording surface of the optical disc and converting it to an electrical signal; and a microprocessor for performing tracking servo control of the optical pickup. The photodetector has a first light receiving section and a second light receiving section which are formed by equally dividing the photodetector in a direction parallel to a track of the optical disc. Further, the microprocessor performs preliminary tracking servo control of the objective lens by moving the objective lens in a radial direction of the optical disc so as to allow the laser beam reflected by the optical disc to be equally divided and received by the first light receiving section and the second light receiving section of the photodetector before starting tracking servo control of the objective lens. The optical pickup according to the first aspect of the present invention makes it possible to obtain an appropriate tracking error signal and achieve stable tracking pull-in, even when an optical disc with an offset center of gravity is mounted on an optical disc apparatus in which the optical pickup is installed.

Preferably, the microprocessor performs the preliminary tracking servo control by moving the objective lens in the radial direction of the optical disc so as to allow DC components of electrical signals generated by the first and second light receiving sections of the photodetector based on their photoelectric conversion of the laser beam received by the first and second light receiving sections of the photodetector, respectively, to be equal to each other before starting the tracking servo control of the objective lens.

Further preferably, when the frequency of a track-crossing signal indicating that the laser beam collected by the objective lens crosses the track becomes equal to or lower than a predetermined threshold value after performing the preliminary tracking servo control of the objective lens, the microprocessor performs tracking servo control by moving the objective lens in the radial direction of the optical disc according to a tracking error signal based on an electrical signal generated by the photodetector using photoelectric conversion. This makes it possible to more surely perform the tracking pull-in of the objective lens.

According to a second aspect of the present invention, the object of the present invention is achieved by an optical disc apparatus comprising an optical pickup which comprises a light emitting element for emitting a laser beam; an objective lens for collecting the laser beam on a recording surface of the optical disc; a photodetector for receiving a beam reflected by the recording surface of the optical disc and converting it to an electrical signal; and a microprocessor for performing tracking servo control of the optical pickup. The photodetector has a first light receiving section and a second light receiving section which are formed by equally dividing the photodetector in a direction parallel to a track of the optical disc. Further, the microprocessor performs preliminary tracking servo control of the objective lens by moving the objective lens in a radial direction of the optical disc so as to allow the laser beam reflected by the optical disc to be equally divided and received by the first light receiving section and the second light receiving section of the photodetector before starting tracking servo control of the objective lens.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
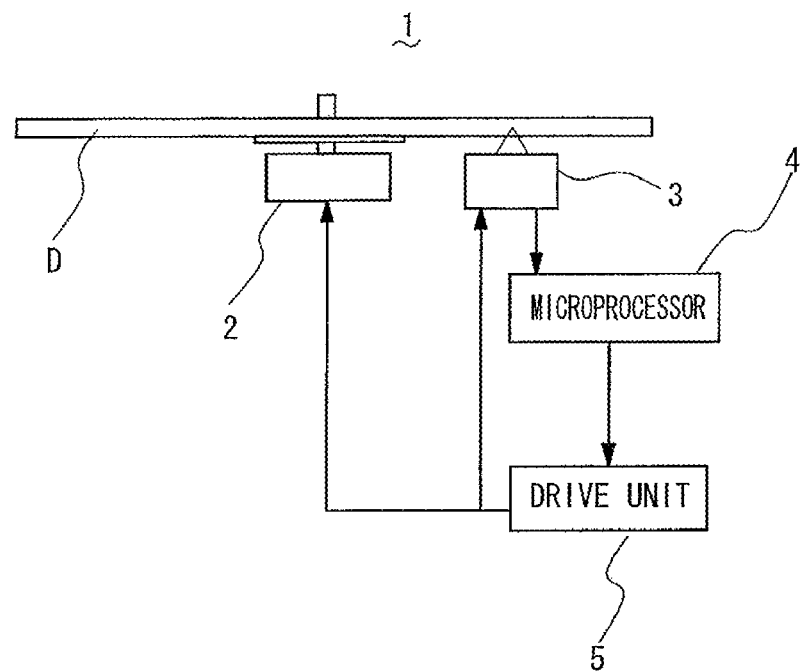
FIG. 1 is a schematic block diagram of an optical disc apparatus according to an embodiment of the present invention.

Embodiments of the present invention, as best mode for carrying out the invention, will be described hereinafter with reference to the drawings. The present invention relates to an optical pickup and an optical disc apparatus. It is to be understood that the embodiments herein are not intended as limiting, or encompassing the entire scope of, the invention. Note that like parts are designated by like reference numerals or characters throughout the drawings.

Figure 2:
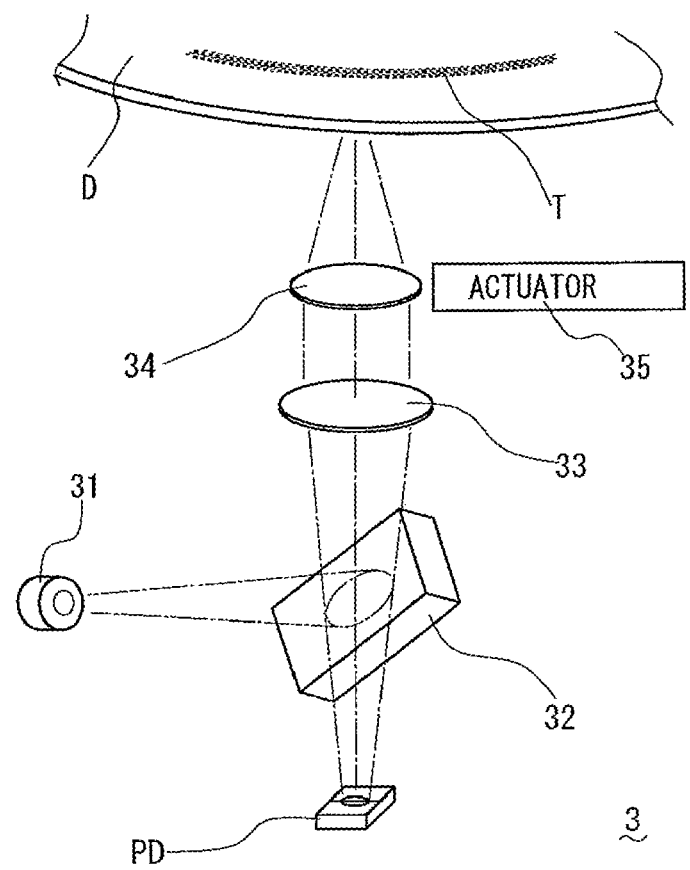
FIG. 2 is a schematic perspective view of an optical pickup according to the embodiment of the present invention.

Referring to FIG. 1, which is a schematic block diagram of an optical disc apparatus 1 according to an embodiment of the present invention, the optical disc apparatus 1 comprises: a spindle motor 2 for rotating an optical disc D mounted thereon; an optical pickup 3 for irradiating a laser beam onto the optical disc D to record/reproduce data on/from the rotating optical disc D; a drive unit 5 for applying drive voltages to the spindle motor 2 and the optical pickup 3; and so on. Referring to FIG. 2, which is a schematic perspective view of the optical pickup 3 according to the embodiment of the present invention, the optical pickup 3 comprises: a laser diode (light emitting element) 31 for emitting a laser beam; a half mirror 32 for reflecting the laser beam output from the laser diode 31 to an objective lens 34; a collimator lens 33 for converting the laser beam reflected by the half mirror 32 to a parallel beam; an objective lens 34 for collecting the parallel beam from the collimator lens 33 (beam emitted from the laser diode 31) on a recording surface of the optical disc D; a photodiode (photodetector) PD for receiving a reflected beam reflected by the recording surface of the optical disc D and converting it to an electrical signal; and a microprocessor 4 for controlling the optical pickup 3 (performing tracking servo control of the optical pickup 3). The half mirror 32 also transmits the beam reflected by the recording surface of the optical disc D to the photodiode PD via the objective lens 34 and the collimator lens 33.

Among the optical elements of the optical pickup 3 described above, the laser diode 31, the half mirror 32, the collimator lens 33 and the photodiode PD are supported by a base (not shown) of the optical pickup 3. On the other hand, although not clearly shown in FIG. 2, the objective lens 34 is supported by an actuator 35 which can reciprocate in a direction parallel to the optical axis of the objective lens 34 or in a radial direction of the optical disc D. The actuator 35 is reciprocated corresponding to small undulations of the recording surface of the optical disc D rotated by the spindle motor 2 so as to focus the objective lens 34 on the recording surface, thereby collecting the laser beam on the recording surface of the optical disc D (i.e. focusing). Further, the actuator 35 is moved in a radial direction of the optical disc D to a position corresponding to a track T formed on the recording surface of the optical disc D so as to focus the objective lens 34 on the track T, thereby collecting the laser beam on the track T of the optical disc D (i.e. tracking). Note that the actuator 35 comprises a focusing coil for focusing and a tracking coil for tracking.

Figure 3:
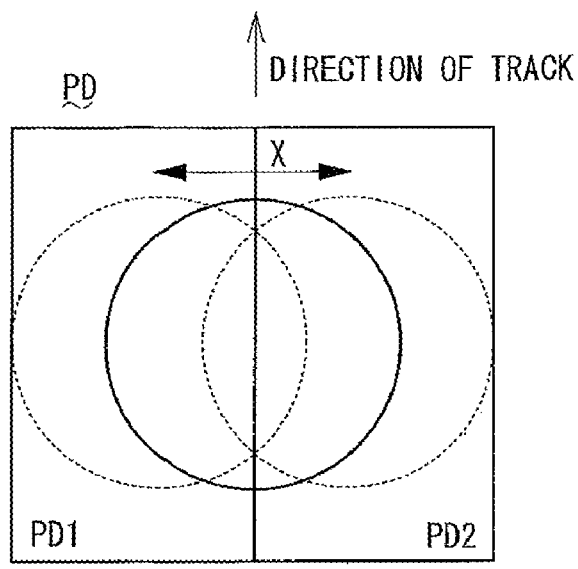
FIG. 3 is a schematic view of a photodiode in the optical pickup and laser beams irradiated on the photodiode.

FIG. 3 is a schematic view of the photodiode PD in the optical pickup 3 and laser beams irradiated on the photodiode PD. Referring to FIG. 3, the photodiode PD has a first light receiving section PD1 and a second light receiving section PD2 which are formed by equally dividing the photodiode PD in a direction parallel to the track T of the optical disc D. When the objective lens 34 is accurately positioned relative to the photodiode PD, the center line of an irradiation area of the laser beam reflected by the optical disc D and irradiated on the photodiode PD coincides with the center line of the photodiode PD (i.e. with the borderline between the first and second light receiving sections PD1, PD2) as shown by the solid line circle in FIG. 3.

In other words, the laser beam reflected by the optical disc D is equally divided and received by the first and second light receiving sections PD1, PD2. Thus, the first and second light receiving sections PD1, PD2 output electrical signals having substantially the same DC component based on their photoelectric conversion of the laser beam. However, when the mounted optical disc D has an offset or eccentric center of gravity, the optical disc D vibrates. The vibration of the optical disc D causes the objective lens 34 supported by the actuator 35 to vibrate, so that as shown by the dotted line circles and the double-headed arrow X in FIG. 3, the irradiation area of the laser beam moves on the photodiode PD due to the vibration or movement of the objective lens 34 relative to the photodiode PD. This in turn causes variations of the DC components of the electrical signals output from the first and second light receiving sections PD1, PD2 which are generated by their photoelectric conversion of the laser beam.

Figure 4:
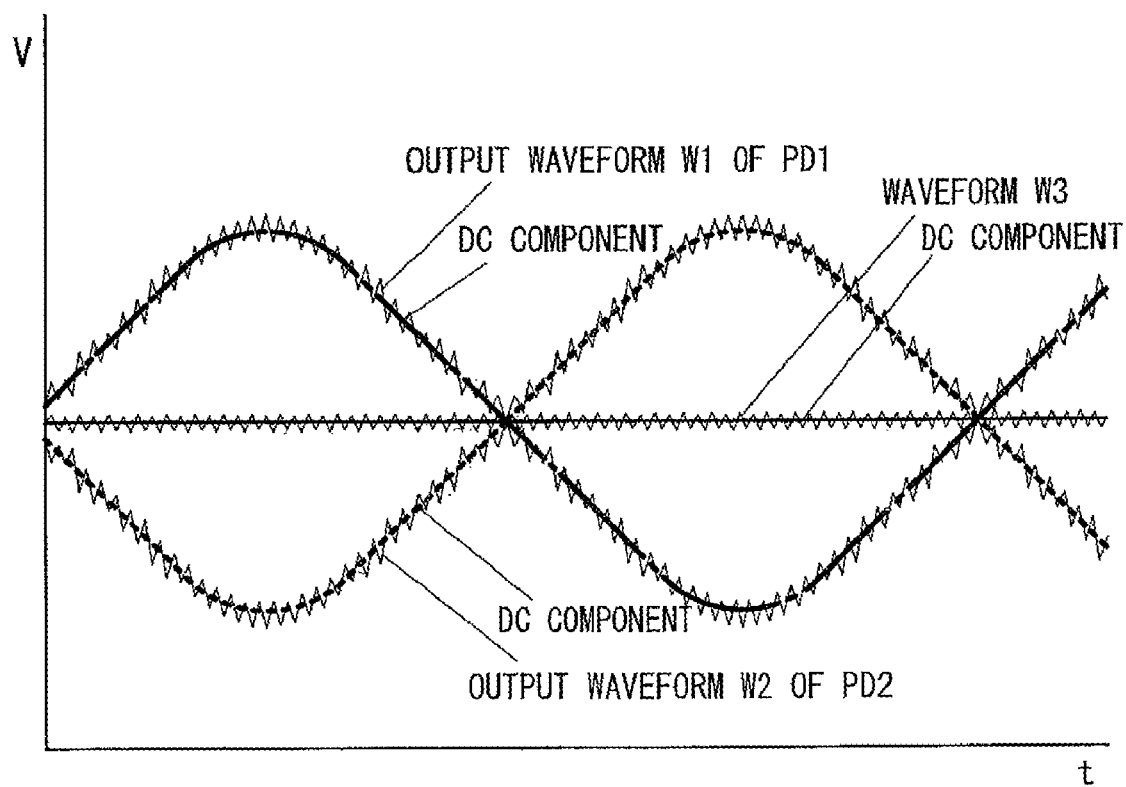
FIG. 4 is a graph showing waveforms of electrical signals output from first and second light receiving sections PD1, PD2 as generated by their photoelectric conversion of the laser beam when an optical disc with an offset center of gravity is mounted on the optical disc apparatus.

FIG. 4 is a graph showing waveforms of electrical signals output from the first and second light receiving sections PD1, PD2 as generated by their photoelectric conversion of the laser beam when an optical disc D with an offset center of gravity is mounted on the optical disc apparatus 1, in which the vertical axis is voltage (V) and the horizontal axis is time (t). In FIG. 4, waveforms W1, W2 show electrical signals output from the first and second light receiving sections PD1, PD2, respectively, while the dash-dotted curve in the waveform W1 and the dashed curve in the waveform W2 show DC components of the waveforms W1, W2, respectively.

For example, when the objective lens 34 reciprocates once during one rotation of the optical disc D, the irradiation area of the laser beam also reciprocates on the photodiode PD once as shown by the double-headed arrow X in FIG. 3 (more specifically, for example, the irradiation area of the laser beam moves from the position shown by the solid line curve to left to the position shown by the dotted line circle on the first light receiving section PD1, then to right to the position shown by the dotted line circle on the second light receiving section PD2, and then back to the position shown by the solid line curve) during the one rotation of the optical disc D. When the objective lens 34 reciprocates in such a manner, the waveforms W1, W2 (the DC components of the waveforms W1, W2) vary as shown e.g. in FIG. 4. This will be described in detail below.

Referring to FIG. 3, when the objective lens 34 moves to the first light receiving section PD1, the irradiation area of the laser beam on the first light receiving section PD1 increases to increase the magnitude of the electrical signal output from the first light receiving section PD1. This causes a reduction in the irradiation area of the laser beam on the second light receiving section PD2, thereby reducing the magnitude of the electrical signal output from the second light receiving section PD2. On the other hand, when the objective lens 34 moves to the second light receiving section PD2, the irradiation area of the laser beam on the second light receiving section PD2 increases to increase the magnitude of the electrical signal output from the second light receiving section PD2. This causes a reduction in the irradiation area of the laser beam on the first light receiving section PD1, thereby reducing the magnitude of the electrical signal output from the first light receiving section PD1. Thus, referring to FIG. 4, the waveform shown by the dash-dotted curve in the waveform W1 and representing the DC component of the waveform W1 is substantially symmetrical to the waveform shown by the dashed curve in the waveform W2 and representing the DC component of the waveform W2.

As described in detail below, a feature of the present embodiment is that the microprocessor 4 performs preliminary tracking servo control of the objective lens 34 to equalize the DC components such that the objective lens 34 is moved in a radial direction of the optical disc D to allow a laser beam reflected by the optical disc D to be equally divided and received by the first and second light receiving sections PD1, PD2, thereby allowing the DC components of the waveforms W1, W2 to be equal to each other. More specifically, when the DC component of the waveform W1 increases, the microprocessor 4 controls to move the objective lens 34 (or controls to move the irradiation area of the laser beam) to the second light receiving section PD2, while when the DC component of the waveform W2 increases, the microprocessor 4 controls to move the objective lens 34 (or controls to move the irradiation area of the laser beam) to the first light receiving section PD1. Such preliminary tracking servo control of the objective lens 34 allows the electrical signals output from the first and second light receiving sections PD1, PD2 to be substantially equal to each other as represented by waveform W3 shown in FIG. 4.

Figure 5:
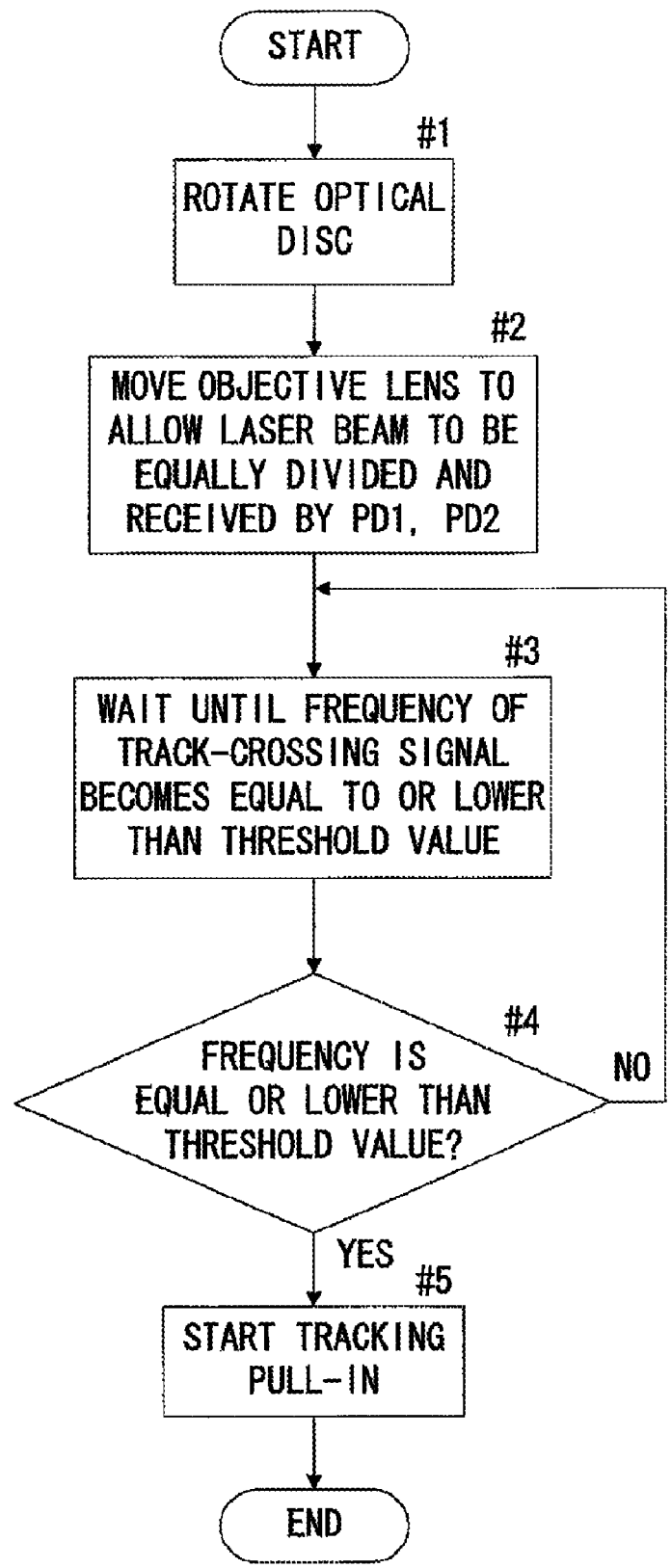
FIG. 5 is a flow chart of an operation of a microprocessor in the optical disc apparatus.

FIG. 5 is a flow chart of an operation of the microprocessor 4 in the optical disc apparatus 1. Referring to FIG. 5, the operation of the microprocessor 4 will be described. When an optical disc D is mounted on the optical disc apparatus 1, the microprocessor 4 controls to rotate the spindle motor 2 to rotate the optical disc D (#1). The microprocessor 4 then moves the objective lens 34 to allow a laser beam reflected by the optical disc D to be equally divided and received by the first and second light receiving sections PD1, PD2 (#2), thereby performing preliminary tracking servo control of the objective lens 34. The microprocessor 4 waits until the frequency of a track-crossing signal (a signal indicating that the laser beam collected by the objective lens 34 crosses the track T) becomes equal to or lower than a predetermined threshold value (e.g. 4 kHz) (#3), and determines whether the frequency of the track-crossing signal is equal to or lower than the predetermined value (#4). If YES in #4, the microprocessor 4 starts tracking pull-in, that is, starts tracking servo control (#5). Such tracking servo control in #5 is equivalent to the prior art, so that its description is omitted here.

As described in the foregoing, according to the optical disc apparatus 1 of the present embodiment, the microprocessor 4 moves the objective lens 34 in a radial direction of an optical disc D so as to allow the laser beam reflected by the optical disc D to be equally divided and received by the first light receiving section PD1 and the second light receiving section PD2 of the photodiode PD before starting tracking servo control of the objective lens 34. More specifically, before microprocessor 4 starts the tracking servo control of the objective lens 34, the microprocessor 4 moves the objective lens 34 so as to allow the DC components of electrical signals generated by the first and second light receiving sections PD1, PD2 based on their photoelectric conversion of the laser beam received by the first and second light receiving sections PD1, PD2, respectively, to be equal to each other.

This makes it possible to maintain the objective lens 34 in a constant position relative to the photodiode PD, performing preliminary tracking servo control of the objective lens 34. Thus, even when an optical disc D with an offset center of gravity is mounted on the optical disc apparatus 1, it is possible to obtain an appropriate tracking error signal based on an electrical signal generated by the photodiode PD using photoelectric conversion and to perform stable tracking pull-in. Further, when the frequency of a track-crossing signal (a signal indicating that the laser beam collected by the objective lens 34 crosses the track T) becomes equal to or lower than a predetermined threshold value, the microprocessor 4 controls to move the objective lens 34 in a radial direction of the optical disc D to perform tracking servo control of the objective lens 34 according to the tracking error signal, so that the tracking pull-in of the objective lens 34 can be more surely performed.

It is to be noted that the present invention is not limited to the above embodiment, and various modifications are possible. For example, the arrangement of the elements of the optical pickup 3 is not limited to the one shown in FIG. 2. In particular, the laser diode 31 and the photodiode PD can be replaced by each other relative to the half mirror 32. If they are replaced by each other, the direction parallel to the track T of the optical disc D in which the photodiode PD is equally divided as described above is to be read or understood as a direction parallel to an image of the track T reflected by the half minor 32.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2009-119058 filed May 15, 2009, the content of which is hereby incorporated by reference.

What is claimed is:

1. An optical pickup comprising:
a light emitting element for emitting a laser beam;
an objective lens for collecting the laser beam on a recording surface of the optical disc;
a photodetector for receiving a beam reflected by the recording surface of the optical disc and converting it to an electrical signal; and
a microprocessor for performing tracking servo control of the optical pickup,
wherein the photodetector has a first light receiving section and a second light receiving section which are formed by equally dividing the photodetector in a direction parallel to a track of the optical disc, and
wherein before starting tracking servo control of the objective lens, the microprocessor performs preliminary tracking servo control of the objective lens by moving the objective lens in a radial direction of the optical disc so as to allow the laser beam reflected by the optical disc to be equally divided and received by the first light receiving section and the second light receiving section of the photodetector even when the optical disc has an offset center of gravity.

2. The optical pickup according to claim 1, wherein the microprocessor performs the preliminary tracking servo control by moving the objective lens in the radial direction of the optical lens so as to allow DC components of electrical signals generated by the first and second light receiving sections of the photodetector based on their photoelectric conversion of the laser beam received by the first and second light receiving sections of the photodetector, respectively, to be equal to each other before starting the tracking servo control of the objective lens.

3. The optical pickup according to claim 2, wherein when the frequency of a track-crossing signal indicating that the laser beam collected by the objective lens crosses the track becomes equal to or lower than a predetermined threshold value after performing the preliminary tracking servo control of the objective lens, the microprocessor performs tracking servo control by moving the objective lens in the radial direction of the optical disc according to a tracking error signal based on an electrical signal generated by the photodetector using photoelectric conversion.

4. The optical pickup according to claim 1, wherein when the frequency of a track-crossing signal indicating that the laser beam collected by the objective lens crosses the track becomes equal to or lower than a predetermined threshold value after performing the preliminary tracking servo control of the objective lens, the microprocessor performs tracking servo control by moving the objective lens in the radial direction of the optical disc according to a tracking error signal based on an electrical signal generated by the photodetector using photoelectric conversion.

5. An optical disc apparatus comprising an optical pickup, the optical pickup comprising:
   a light emitting element for emitting a laser beam;
   an objective lens for collecting the laser beam on a recording surface of the optical disc;
   a photodetector for receiving a beam reflected by the recording surface of the optical disc and converting it to an electrical signal; and
   a microprocessor for performing tracking servo control of the optical pickup,
      wherein the photodetector has a first light receiving section and a second light receiving section which are formed by equally dividing the photodetector in a direction parallel to a track of the optical disc, and
      wherein before starting tracking servo control of the objective lens, the microprocessor performs preliminary tracking servo control of the objective lens by moving the objective lens in a radial direction of the optical disc so as to allow the laser beam reflected by the optical disc to be equally divided and received by the first light receiving section and the second light receiving section of the photodetector even when the optical disc has an offset center of gravity.

6. The optical disc apparatus according to claim 5, wherein the microprocessor performs the preliminary tracking servo control by moving the objective lens in the radial direction of the optical disc so as to allow DC components of electrical signals generated by the first and second light receiving sections of the photodetector based on their photoelectric conversion of the laser beam received by the first and second light receiving sections of the photodetector, respectively, to be equal to each other before starting the tracking servo control of the objective lens.

7. The optical disc apparatus according to claim 6, wherein when the frequency of a track-crossing signal indicating that the laser beam collected by the objective lens crosses the track becomes equal to or lower than a predetermined threshold value after performing the preliminary tracking servo control of the objective lens, the microprocessor performs tracking servo control by moving the objective lens in the radial direction of the optical disc according to a tracking error signal based on an electrical signal generated by the photodetector using photoelectric conversion.

8. The optical disc apparatus according to claim 5, wherein when the frequency of a track-crossing signal indicating that the laser beam collected by the objective lens crosses the track becomes equal to or lower than a predetermined threshold value after performing the preliminary tracking servo control of the objective lens, the microprocessor performs tracking servo control by moving the objective lens in the radial direction of the optical disc according to a tracking error signal based on an electrical signal generated by the photodetector using photoelectric conversion.

* * * * *